(12) United States Patent
Fujita

(10) Patent No.: US 11,710,583 B2
(45) Date of Patent: Jul. 25, 2023

(54) OXIDE SUPERCONDUCTING WIRE AND SUPERCONDUCTING COIL

(71) Applicant: Fujikura Ltd., Tokyo (JP)

(72) Inventor: Shinji Fujita, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/917,086

(22) PCT Filed: Apr. 6, 2020

(86) PCT No.: PCT/JP2020/015457
§ 371 (c)(1),
(2) Date: Oct. 5, 2022

(87) PCT Pub. No.: WO2021/205495
PCT Pub. Date: Oct. 14, 2021

(65) Prior Publication Data
US 2023/0126510 A1    Apr. 27, 2023

(51) Int. Cl.
*H01B 12/04*    (2006.01)
*H01B 12/06*    (2006.01)

(52) U.S. Cl.
CPC ............. *H01B 12/04* (2013.01); *H01B 12/06* (2013.01)

(58) Field of Classification Search
CPC ................................ H01B 12/04; H01B 12/06
See application file for complete search history.

(56) References Cited

U.S. PATENT DOCUMENTS 6,469,253 B1 * 10/2002 Saga .................... H10N 60/203
   505/231
6,803,684 B2 * 10/2004 Wang .................... H02K 55/04
   310/52

(Continued)

FOREIGN PATENT DOCUMENTS

JP    2012156047 A    8/2012
JP       6307987 B2    4/2018

(Continued)

OTHER PUBLICATIONS

Shin, H., "Establishing a test procedure for evaluating the electro-mechanical properties of practical REBCO coated conductor tapes by the uniaxial tension test at 77K", IOP Supercond Sci. Tech., vol. 32, 2019 (Year: 2019).*

(Continued)

*Primary Examiner* — Peter Dungba Vo
*Assistant Examiner* — Jose K Abraham
(74) *Attorney, Agent, or Firm* — Osha Bergman Watanabe & Burton LLP

(57) ABSTRACT

A superconducting coil comprising an oxide superconducting wire includes: a superconducting laminate comprising a substrate and an oxide superconducting layer; and a stabilization layer made of copper plating formed around the superconducting laminate. A thickness d of the stabilization layer is in the range of 10 to 40 μm. A ratio Ra/d of the thickness d of the stabilization layer and an arithmetic mean roughness Ra of an outer surface of the stabilization layer is in the range of 0.005 to 0.03. An intermediate layer is arranged between the substrate and the oxide superconducting layer. When a tensile test of pulling the oxide superconducting wire in a longitudinal direction within a stress range of 180 to 600 MPa in liquid nitrogen is performed, a ratio of a critical current when a repeated pulling number reaches (Continued)

100,000 times and an initial critical current measured before the tensile test is 0.99 or more.

4 Claims, 2 Drawing Sheets

(56) References Cited

U.S. PATENT DOCUMENTS

| | | | | |
|---|---|---|---|---|
| 9,349,936 | B2* | 5/2016 | Otto | H10N 60/857 |
| 2011/0244234 | A1* | 10/2011 | Taneda | C25D 5/34 |
| | | | | 428/375 |
| 2014/0357495 | A1* | 12/2014 | Daibo | H01B 12/06 |
| | | | | 505/211 |
| 2016/0359097 | A1* | 12/2016 | Kurihara | H01B 12/02 |
| 2017/0309374 | A1* | 10/2017 | Na | H01B 7/20 |
| 2018/0204658 | A1* | 7/2018 | Osabe | H01B 12/06 |
| 2019/0259512 | A1* | 8/2019 | Nagaishi | H01F 6/06 |

FOREIGN PATENT DOCUMENTS

| | | |
|---|---|---|
| WO | 2013129568 A1 | 9/2013 |
| WO | 2017104753 A1 | 6/2017 |
| WO | 2018078876 A1 | 5/2018 |

OTHER PUBLICATIONS

Chen, W., "Fatigue Behavior of Critical Current Degradation for YBCO Tapes at 77K", IEEE Trans Applied Supercond., vol. 28, Apr. 3, 2018 (Year: 2018).*

Shin H., "Mechanical and transport properties of IBAD/EDDC-SmBCO coated conductor tapes during fatigue loading" Cryogenics, 51, 237-240, 2011 (Year: 2011).*

International Search Report issued in corresponding International Application No. PCT/JP2020/015457, dated Jun. 9, 2020, with translation (5 pages).

Written Opinion issued in corresponding International Application No. PCT/JP2020/015457, dated Jun. 9, 2020, with translation (8 pages).

* cited by examiner

OXIDE SUPERCONDUCTING WIRE AND SUPERCONDUCTING COIL

TECHNICAL FIELD

The present invention relates to an oxide superconducting wire and a superconducting coil.

BACKGROUND

In a superconducting coil formed by winding a superconducting wire having an oxide superconducting layer laminated on a substrate, a strong tensile force may be repeatedly applied in the longitudinal direction of the superconducting wire. Therefore, it is important that the superconducting wire used for the superconducting coil has a proof stress against repeated tensile stress.

As a configuration of the superconducting wire, a stabilization layer made of copper plating may be formed around the superconducting laminate.

In Patent Document 1, in order to reliably prevent the occurrence of swelling and peeling of the resin coat, a superconducting wire is disclosed having a surface roughness of the upper surface and the lower surface of the Cu stabilization layer formed on the outer periphery of 0.3 to 1 µm, which is based on the arithmetic average (i.e., mean) roughness Ra of JIS B0601: 2013.

In Patent Document 2, in order to prevent peeling of the superconducting layer when the resin material is baked so as to cover the outer surface of the superconducting laminate to form an insulating coating layer, a superconducting wire is disclosed in which an outer surface of the superconducting laminate has a maximum height Rz of 890 nm or less, which is based on JIS B0601: 2013.

CITATION LIST

Patent Document

[Patent Document 1]
Japanese Patent No. 6307987
[Patent Document 2]
International Patent Publication No. 2013/129568

As described in Patent Document 2, the stabilization layer formed by copper plating generally has a smooth outer surface and a small surface roughness. Patent Document 1 describes that the surface roughness of the stabilization layer is increased by adjusting the copper plating conditions. However, when tensile stress is repeatedly applied, the stabilization layer is cured, and if the stabilization layer is too rough, the superconducting characteristics may deteriorate or at least a portion of the superconducting wire breaks due to the surface roughness.

SUMMARY

One or more embodiments of the present invention provide an oxide superconducting wire or a superconducting coil whose characteristics are unlikely to deteriorate even when tensile stress is repeatedly applied.

In one or more embodiments of the present invention, a superconducting laminate includes a substrate and an oxide superconducting layer, and a stabilization layer made of copper plating formed around the superconducting laminate, in which a thickness d of the stabilization layer is in the range of 2 to 100 µm, and a ratio Ra/d of the thickness d of the stabilization layer and an arithmetic mean roughness Ra of an outer surface of the stabilization layer is in a rage of 0.005 or more and less than 0.05.

In the oxide superconducting wire of the above-described embodiments, the arithmetic average roughness Ra of the outer surface may be in the range of 0.1 to 1.0 µm.

In addition, the thickness of the substrate may be in the range of 50 to 75 µm.

An insulating layer made of a resin tape may be provided around the stabilization layer.

An intermediate layer may be arranged between the substrate and the oxide superconducting layer, the thickness d of the stabilization layer may be in the range of 10 to 40 µm, and when a tensile test of pulling the oxide superconducting wire in a longitudinal direction within a stress range of 180 to 600 MPa in liquid nitrogen may be performed, a ratio (Ic/Ic0) of a critical current (Ic) when a repeated pulling number reaches 100,000 times and an initial critical current (Ic0) measured before the tensile test is 0.99 or more.

The superconducting coil according to one or more embodiments of the present invention is configured by winding the oxide superconducting wire according to the above described embodiments.

According to the above-described embodiments, the ratio Ra/d of the thickness d and the arithmetic mean roughness Ra is adjusted within an appropriate range with respect to the thickness d of the stabilization layer made of copper plating. Therefore, it is possible to provide an oxide superconducting wire or a superconducting coil whose characteristics are not easily deteriorated even when tensile stress is repeatedly applied.

DETAILED DESCRIPTION

Hereinafter, embodiments will be described with reference to the drawings.

Figure 1:
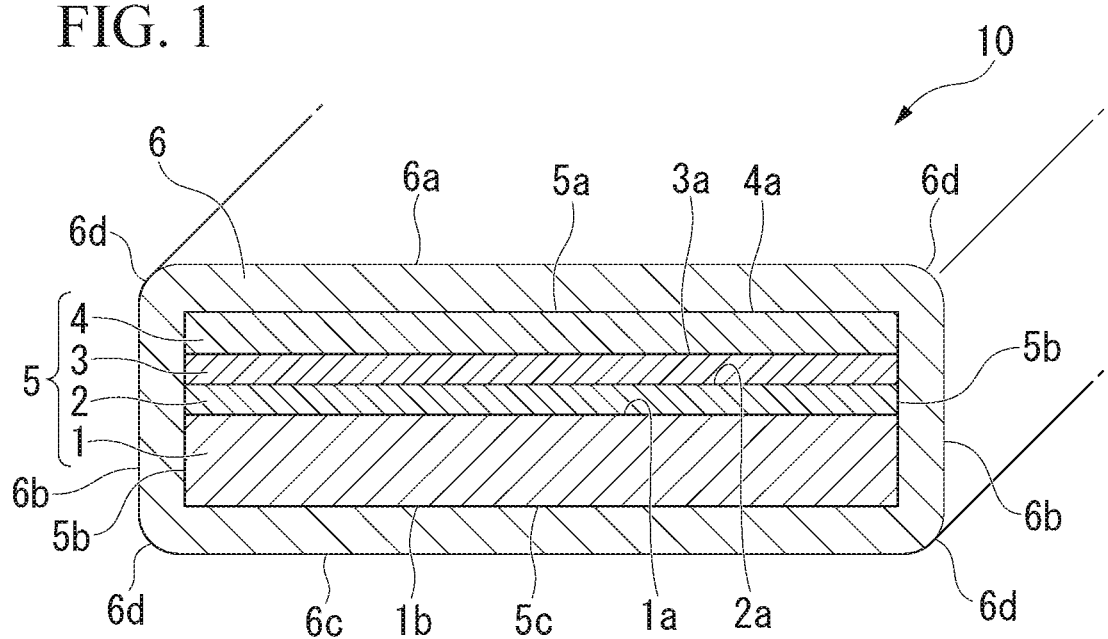
FIG. 1 is a perspective view showing a schematic cross-section of the oxide superconducting wire according to one or more embodiments.

FIG. 1 schematically shows an example of a schematic structure of an oxide superconducting wire (hereinafter, simply referred to as a superconducting wire 10) according to one or more embodiments. The superconducting wire 10 includes a superconducting laminate 5 having a substrate 1 and an oxide superconducting layer 3, and a stabilization layer 6 formed around the superconducting laminate 5. The superconducting laminate 5 of one or more embodiments includes an intermediate layer 2 between the substrate 1 and the oxide superconducting layer 3, and a protection layer 4 on the oxide superconducting layer 3 on the opposite side of the substrate 1. That is, the intermediate layer 2, the oxide superconducting layer 3, and the protection layer 4 are laminated in this order on one main surface 1a of the tape-shaped substrate 1.

The substrate 1 is tape-shaped and includes main surfaces 1a and 1b on both sides in the thickness direction, respectively. The substrate 1 is made of, for example, metal. Specific examples of the metal constituting the substrate 1 include nickel alloys typified by Hastelloy (registered trademark), stainless steel, and oriented NiW alloys in which a texture is introduced into the nickel alloy. The thickness of the substrate 1 may be appropriately adjusted according to the purpose, and is, for example, in the range of 10 to 500 µm. In order to make the superconducting wire 10 thin, in one or more embodiments, the thickness of the substrate 1 is in the range of 50 to 75 µm. If the substrate 1 is too thick, the current density per unit cross-sectional area of the superconducting wire 10 decreases. If the substrate 1 is too thin, the strength of the superconducting wire 10 decreases when an external force such as an electromagnetic force is applied. In the substrate 1, the surface on which the intermediate layer 2 is formed is referred to as a first main surface 1a, and the surface opposite to the first main surface 1a is referred to as a second main surface 1b.

From the viewpoint of orientation control of the oxide superconducting layer 3, in one or more embodiments, the intermediate layer 2 is provided on the first main surface 1a of the substrate 1 and the oxide superconducting layer 3 is formed on the main surface 2a of the intermediate layer 2. The main surface 2a of the intermediate layer 2 is a surface opposite to the substrate 1 side. The intermediate layer 2 may have a multi-layer structure, and may have a diffusion prevention layer, a bed layer, an orientation layer, a cap layer, and the like in the order from the substrate 1 side to the oxide superconducting layer 3 side, for example. These layers are not always provided one by one, and some layers may be omitted, or two or more layers of the same type may be repeatedly laminated. When the first main surface 1a of the substrate 1 has orientation, the intermediate layer 2 may not be formed.

The diffusion prevention layer has a function of suppressing a portion of the components of the substrate 1 from diffusing and being mixed into the oxide superconducting layer 3 side as impurities. Examples of the material of the diffusion prevention layer include Si3N4, Al2O3, GZO (Gd2Zr2O7) and the like. The thickness of the diffusion prevention layer is, for example, 10 to 400 nm.

The bed layer is used to reduce the reaction at the interface between the substrate 1 and the oxide superconducting layer 3 to improve the orientation of the layer formed on the bed layer. Examples of the material of the bed layer include Y2O3, Er2O3, CeO2, Dy2O3, Eu2O3, Ho2O3, La2O3, and the like. The thickness of the bed layer is, for example, 10 to 100 nm.

The orientation layer is formed from a biaxially oriented substance to control the crystal orientation of the cap layer formed thereon. Examples of the material of the orientation layer include metal oxides such as Gd2Zr2O7, MgO, ZrO2-Y2O3(YSZ), SrTiO3, CeO2, Y2O3, Al2O3, Gd2O3, Zr2O3, Ho2O3, Nd2O3, and the like. In one or more embodiments, the orientation layer is formed by an Ion-Beam-Assisted Deposition (IBAD) method.

The cap layer is formed on the surface of the orientation layer described above, and formed of a material in which the crystal grains can be oriented in an in-plane direction. Examples of the material of the cap layer include CeO2, Y2O3, Al2O3, Gd2O3, ZrO2, YSZ, Ho2O3, Nd2O3, LaMnO3, and the like. The thickness of the cap layer is, for example, 50 to 5000 nm.

The oxide superconducting layer 3 is composed of an oxide superconductor. The oxide superconductor is not particularly limited, and examples thereof include a RE-Ba—Cu—O-based oxide superconductor represented by the general formula REBa2Cu3Ox (RE123). Examples of the rare earth element RE include one or more of Sc, Y, La, Ce, Pr, Nd, Pm, Sm, Eu, Gd, Tb, Dy, Ho, Er, Tm, Yb, and Lu.

The thickness of the oxide superconducting layer 3 is, for example, approximately 0.5 to 5 µm. Examples of the method for laminating the oxide superconducting layer 3 include a sputtering method, a vacuum vapor deposition method, a laser vapor deposition method, an electron beam vapor deposition method, a Pulsed Laser Deposition method (PLD method), a Chemical Vapor Deposition method (CVD method), a Metal Organic Decomposition method (MOD method), and the like. Above all, from the viewpoint of productivity and the like, the oxide superconducting layer 3 may be laminated by the PLD method in one or more embodiments. The oxide superconducting layer 3 may include impurities such as artificial pins.

The protection layer 4 has functions such as bypassing an overcurrent generated at the time of an accident and suppressing a chemical reaction occurring between the oxide superconducting layer 3 and the layer provided on the protection layer 4. Examples of the material of the protection layer 4 include silver (Ag), copper (Cu), gold (Au), and alloys including one or more kinds of these materials. When an Ag layer or an Ag alloy layer is used for the protection layer 4, the protection layer 4 may include 50% or more of silver in terms of molar ratio or weight ratio. The protection layer 4 covers at least a main surface 3a of the oxide superconducting layer 3. The main surface 3a of the oxide superconducting layer 3 is the surface opposite to a side of the intermediate layer 2. The protection layer 4 may cover a portion or all of a region selected from a side surface of the oxide superconducting layer 3, a side surface of the intermediate layer 2, and a side surface and a back surface of the substrate 1. The protection layer 4 may be composed of two or more kinds or two or more layers of metal layers. The thickness of the protection layer 4 is not particularly limited; however, it may be approximately 1 to 30 µm, for example.

The superconducting laminate 5 includes a first main surface 5a and a second main surface 5c. The first main surface 5a of the superconducting laminate 5 is the surface on the side where the oxide superconducting layer 3 is laminated when viewed from the substrate 1. When the superconducting laminate 5 includes the protection layer 4, the first main surface 5a may be the main surface 4a of the protection layer 4. The main surface 4a of the protection layer 4 is a surface opposite to the oxide superconducting layer 3 side. The second main surface 5c of the superconducting laminate 5 is a surface opposite to the first main surface 5a in the thickness direction of the superconducting laminate 5. The second main surface 5c of the superconducting laminate 5 may be the second main surface 1b of the substrate 1. When the protection layer 4 is laminated on the second main surface 1b of the substrate 1, at least a portion of the second main surface 5c of the superconducting laminate 5 may be composed of the outer surface of the protection layer 4.

In addition, the superconducting laminate 5 includes side surfaces 5b on both sides in the width direction. The side surface 5b of the superconducting laminate 5 may include the side surface of the substrate 1, the side surface of the intermediate layer 2, the side surface of the oxide superconducting layer 3, and the side surface of the protection layer 4. When at least a portion of the side surface 5b of the superconducting laminate 5 is covered with the protection layer 4, at least a portion of the side surface 5b of the superconducting laminate 5 may be composed of the outer surface of the protection layer 4.

The stabilization layer 6 is formed so as to cover at least a portion of the outer surface of the superconducting laminate 5. In particular, the stabilization layer 6 covers at least a portion of the first main surface 5a and at least a portion of the second main surface 5c of the superconducting laminate 5. In one or more embodiments, the stabilization layer 6 may cover the entire region of the first main surface 5a, the two side surfaces 5b, and the second main surface 5c of the superconducting laminate 5. The thickness d of the stabilization layer 6 is not particularly limited; however, it is, for example, approximately 1 to 300 µm. From the viewpoint of making the superconducting wire 10 thin and ensuring the proof stress against repeated tensile stress, in one or more embodiments, the thickness d of the stabilization layer 6 is in the range of 2 to 100 µm.

The stabilization layer 6 has a function as a bypass portion for commutating the overcurrent generated when the oxide superconducting layer 3 is transferred to the normal conducting state. Examples of the constituent material of the stabilization layer 6 include metals such as copper, copper alloys (for example, Cu—Zn alloy, Cu—Ni alloy, and the like), aluminum, aluminum alloys, and silver. The stabilization layer 6 can be formed by plating such as electrolytic plating. From the viewpoint of conductivity, cost, and the like, the stabilization layer 6 may be made of copper plating in one or more embodiments. Prior to the step of forming the stabilization layer 6 by copper plating, a base metal layer (not shown) may be formed on the outer surface of the superconducting laminate 5 by sputtering or the like. As the material of the base metal layer, the same metal as that to be plated is generally used. Examples of the thickness of the base metal layer include 0.1 to 10 µm. The base metal layer may be formed thinner than the stabilization layer 6.

Next, a means for improving the proof stress against repeated tensile stress will be described. When tensile stress is repeatedly applied and the thickness of the stabilization layer 6 is locally thin, or the arithmetic average roughness Ra of the outer surface of the stabilization layer 6 is locally large (rough portion), stress is concentrated in thin or rough portions. Therefore, starting from these points, deterioration of superconducting characteristics or breakage of at least a portion of the superconducting wire may occur.

When the thickness of the stabilization layer 6 is increased as a whole, the stress is dispersed over the entire thickness and the proof stress against repeated tensile stress is improved; however, the cross-sectional area or the thickness of the superconducting wire 10 is increased. That is, the ratio of the cross-sectional area or thickness of the oxide superconducting layer 3 to the cross-sectional area or thickness of the superconducting wire 10 decreases. Therefore, in applied products such as superconducting coils and superconducting cables, the current density when averaged by the cross-sectional area of the applied products is low. Therefore, in order to improve the performance of the applied product, the cross-sectional area or the thickness of the superconducting wire 10 may be reduced in one or more embodiments.

In order to improve the proof stress against repeated tensile stress while reducing the thickness d of the stabilization layer 6, it may be that the thinner the thickness d of the stabilization layer 6, the less the arithmetic mean roughness Ra of the outer surface of the stabilization layer 6. Therefore, in one or more embodiments, if the ratio Ra/d of the thickness d of the stabilization layer 6 and the arithmetic average roughness Ra of the outer surface of the stabilization layer 6 is within a predetermined small range, it is conceivable that this contributes to the improvement of the proof stress. In particular, the ratio Ra/d may be in the range of 0.005 or more and less than 0.05, or 0.04 or less, or 0.03 or less. As a result, it is possible to obtain a superconducting wire 10 whose characteristics are unlikely to deteriorate even when the tensile stress is repeatedly applied.

When the arithmetic mean roughness Ra of the outer surface of the stabilization layer 6 is small, there is a question in the selection of plating conditions and productivity, such as slowing the plating speed in the film formation by copper plating. Therefore, it is effective to control the ratio Ra/d as described above in order that the thickness d of the stabilization layer 6 can be reduced without excessively reducing the arithmetic average roughness Ra of the outer surface of the stabilization layer 6, and the proof stress against repeated tensile stress is improved. The arithmetic average roughness Ra of the outer surface of the stabilization layer 6 may be in the range of 0.1 to 1.0 µm. Within such a range, sufficient adhesion between the stabilization layer 6 and the impregnated resin described later can be ensured.

When the thickness d of the stabilization layer 6 or the value of the arithmetic mean roughness Ra of the outer surface of the stabilization layer 6 is different for each region of the outer surface of the stabilization layer 6, it may be that for each region, the value of the thickness d of the stabilization layer 6 and the value of the ratio Ra/d be within the ranges described above. For example, as a region constituting the outer surface of the stabilization layer 6, a first main surface 6a, two side surfaces 6b, a second main surface 6c, and four corner portions 6d can be mentioned. Within the region where the value of the thickness d of the stabilization layer 6 or the arithmetic mean roughness Ra of the outer surface of the stabilization layer 6 is not expected to change significantly, the value of the thickness d of the stabilization layer 6 and the value of the ratio Ra/d may be set by the representative value such as the average value. The first main surface 6a of the stabilization layer 6 is a region corresponding to the first main surface 5a of the superconducting laminate 5. The side surface 6b of the stabilization layer 6 is a region corresponding to the side surface 5b of the superconducting laminate 5. The second main surface 6c of the stabilization layer 6 is a region corresponding to the second main surface 5c of the superconducting laminate 5. The corner portion 6d of the stabilization layer 6 is a region between the main surfaces 6a and 6c and the side surface 6b.

The method of manufacturing the superconducting wire 10 includes, for example, a lamination step and a stabilization-layer formation step. In the lamination step, the oxide superconducting layer 3 is laminated on the substrate 1 with or without the intermediate layer 2 being intervened therebetween to fabricate the superconducting laminate 5. In the stabilization-layer formation step, the stabilization layer 6 is formed around the superconducting laminate 5. When manufacturing the superconducting wire 10, the thickness d of the stabilization layer 6 and the arithmetic mean roughness Ra of the outer surface of the stabilization layer 6 are adjusted so that the thickness d of the stabilization layer 6 and the ratio Ra/d are within the above-described ranges. For example, in the stabilization layer formation step, when the stabilization layer 6 is formed by Cu plating, the thickness d of the stabilization layer 6 and the arithmetic mean roughness Ra of the outer surface of the stabilization layer 6 are adjusted by setting the conditions of the Cu plating. In addition, after the stabilization layer formation step, the arithmetic average roughness Ra can be adjusted, for example, by processing the outer surface of the stabilization layer 6 with an abrasive material such as polishing paper.

Figure 2:
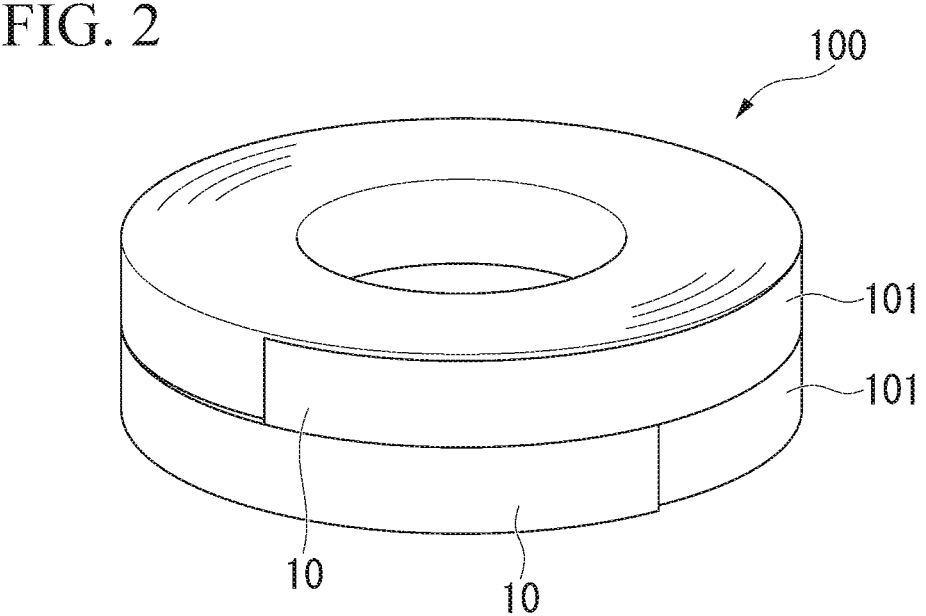
FIG. 2 is a perspective view showing an example of a superconducting coil according to one or more embodiments.

FIG. 2 shows an example of a superconducting coil 100 using the superconducting wire 10 according to one or more embodiments. In order to fabricate the superconducting coil 100, for example, the superconducting wire 10 is wound along the outer peripheral surface of the winding core to form a multi-layered coil body 101. In the coil body 101, the superconducting wire 10 is laminated in the thickness direction. A plurality of superconducting wire members 10 may be connected to form one coil body 101. Next, the superconducting coil 100 is obtained by impregnating the coil body 101 with a resin such as an epoxy resin so as to cover the coil body 101 to fix the superconducting wire 10.

The superconducting coil 100 shown in FIG. 2 is configured by laminating a plurality of coil bodies 101 which are pancake coils. A pancake coil is a coil formed by winding the tape-shaped superconducting wire 10 so as to overlap in the thickness direction. Each coil body 101 is annular. A plurality of coil bodies 101 may be electrically connected to each other. The superconducting coil 100 can be used for a superconducting apparatus. The number of coil bodies 101 included in the superconducting coil 100 is not particularly limited. That is, the superconducting coil 100 can include one or more coil bodies 101.

In the superconducting coil 100 in which the superconducting wire 10 is wound in a coil shape, during cooling, stress (peeling stress) may be applied in a direction in which each layer is peeled off such as in the thickness direction of the superconducting laminate 5 due to the difference in a thermal expansion coefficient between the superconducting wire 10 and the resin. Since the superconducting wire 10 of one or more embodiments has excellent proof stress against repeated tensile stress, the proof stress against peeling stress of the superconducting coil 100 also becomes favorable.

In one or more embodiments, an insulating layer may be provided on the outer periphery of the superconducting wire 10 in order to secure electrical insulation from the periphery of the superconducting wire 10. When the superconducting wire 10 is used for the superconducting coil 100, the superconducting wire 10 has an insulating layer, so that the electrical insulation of the superconducting wire 10 constituting the coil body 101 can be easily ensured regardless of the degree of adhesion of the impregnated resin.

Figure 3:
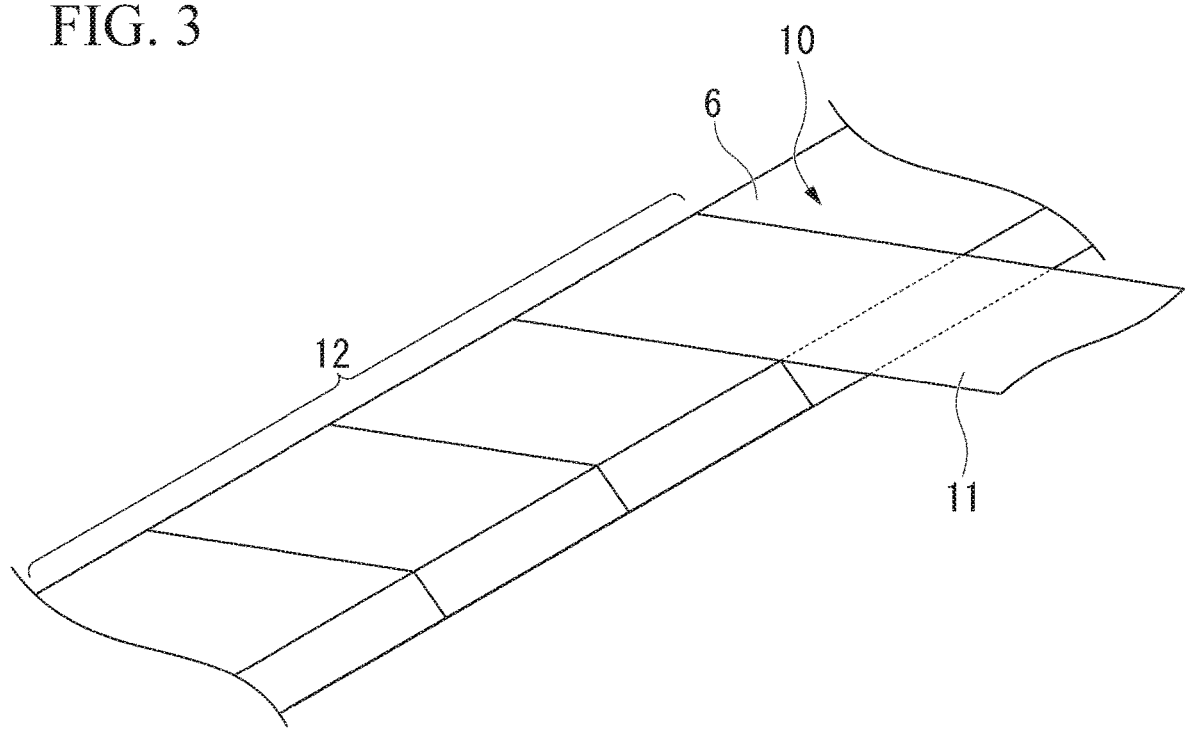
FIG. 3 is a perspective view showing an example of the oxide superconducting wire which includes an insulating layer of a resin tape according to one or more embodiments.

FIG. 3 shows an example of a superconducting wire 10 having an insulating layer of a resin tape according to one or more embodiments. FIG. 3 shows a state in which the resin tape 11 is being wound around the superconducting wire 10; however, finally the resin tape 11 is wound without a gap over the entire length of the superconducting wire 10. That is, the insulating layer 12 is formed by the resin tape 11 over the entire length of the superconducting wire 10. In the superconducting wire 10 of one or more embodiments, the insulating layer 12 be formed by winding the resin tape 11 around the outer surface of the stabilization layer 6. Examples of the resin tape 11 include an insulating tape such as polyimide. Examples of the thickness of the resin tape 11 include 5 to 50 µm, and 7.5 µm to 12.5 µm.

Examples of the method of winding the resin tape 11 around the superconducting wire 10 include butt winding and wrap winding. The butt winding is a method in which the side surfaces of the resin tape 11 are butted and spirally wound so that the end portions in the width direction of the resin tape 11 do not overlap each other. The wrap winding is a method of overlapping the end portions of the resin tape 11 in the width direction and winding them in a spiral shape. In the butt winding and the wrap winding, two or more resin tapes 11 may be wound in parallel around the superconducting wire 10. The method of forming the insulating layer 12 from the resin tape 11 is not limited to the spiral winding, and for example, vertical wrapping may be employed. The vertical wrapping is a method of wrapping the superconducting wire 10 with the resin tape 11 by matching the longitudinal direction of the superconducting wire 10 with the longitudinal direction of the resin tape 11.

Compared to the case where the insulating layer 12 is formed by coating with a liquid insulating resin or the like, when the insulating layer 12 is constituted by the resin tape 11, the insulating layer 12 does not completely adhere on the outer peripheral surface of the stabilization layer 6. Therefore, when the superconducting wire 10 is cooled to a low temperature below the critical temperature, an air layer remains around the resin tape 11, or the superconducting wire 10 repeatedly shrinks and expands in response to a temperature change between the low temperature and the normal temperature, which possibly affects peeling stress. Therefore, by adjusting the ratio Ra/d as described above, the proof stress against repeated tensile stress can be improved. That is, setting the ratio Ra/d within the above-described range is more effective when the insulating layer 12 is formed by using the resin tape 11.

Although the present invention has been described above based on the above-described embodiments, the present invention is not limited to the above-described embodiments, and various modifications can be made without departing from the gist of the present invention. Modifications include addition, replacement, omission, and other changes to components in each embodiment. It is also possible to appropriately combine the components used in two or more embodiments.

EXAMPLES

Hereinafter, the above-described embodiments will be described with reference to Examples.

Hastelloy (registered trademark) having a thickness of 75 µm was used as the substrate 1. A superconducting layer 3 of GdBCO was laminated on the substrate 1 via an intermediate layer 2, and a protection layer 4 of Ag was laminated on the superconducting layer 3 to prepare a superconducting laminate 5. A Cu stabilization layer 6 was formed on the outer periphery of the superconducting laminate 5 by electrolytic plating to a predetermined thickness, and a superconducting wire 10 having a width of 4 mm was fabricated. The surface roughness of the outer surface of the stabilization layer 6 was adjusted with abrasive paper to prepare a plurality of samples 1 to 9. Tensile tests were performed in which each sample 1 to 9 was pulled in the longitudinal direction in liquid nitrogen within a stress range of 180 to 600 MPa. In the tensile test, the critical current (Ic) was measured every 1000 times of repeated tension (every time a multiple of 1000 was reached). When the ratio (Ic/Ic0) of the critical current (Ic) to the initial critical current (Ic0) measured before the tensile test was less than 0.99, it was judged that the characteristics of the superconducting wire 10 had deteriorated. When the characteristic deterioration was not reached even if the number of repeated tensions exceeded 100,000, the tensile test was completed without specifying the number of times the deterioration was reached.

TABLE 1

| SAMPLE No. | d [µm] | Ra [µm] | Ra/d | NUMBER OF TIMES TO REACH DETERIORATION |
|---|---|---|---|---|
| 1 | 10 | 0.1 | 0.01 | >100,000 |
| 2 | 10 | 0.3 | 0.03 | >100,000 |
| 3 | 10 | 0.5 | 0.05 | 15,000 |

TABLE 1-continued

| SAMPLE No. | d [µm] | Ra [µm] | Ra/d | NUMBER OF TIMES TO REACH DETERIORATION |
|---|---|---|---|---|
| 4 | 20 | 0.1 | 0.005 | >100,000 |
| 5 | 20 | 0.5 | 0.025 | >100,000 |
| 6 | 20 | 1.0 | 0.05 | 42,000 |
| 7 | 40 | 0.5 | 0.0125 | >100,000 |
| 8 | 40 | 1.0 | 0.025 | >100,000 |
| 9 | 40 | 2.0 | 0.05 | 1,000 |

For each sample number, Table 1 shows the test results of the thickness d [µm] of the stabilization layer 6, the arithmetic mean roughness Ra [µm] of the outer surface of the stabilization layer 6, the ratio Ra/d thereof, and the number of times that reach deterioration of the characteristics. For samples that did not reach deterioration even when the number of repeated tensions exceeded 100,000, ">100,000" is described in the column of the number of times to reach deterioration.

As shown in Table 1, in the samples 1, 2, 4, 5, 7, and 8 having a ratio Ra/d of less than 0.05, the characteristics of the superconducting wire did not deteriorate even when the number of repeated tensions reaches 100,000.

As described above, an excellent superconducting wire 10 can be obtained by setting the ratio Ra/d in the range of 0.005 to 0.03, and the value of Ic/Ic0 when the number of repeated tensions reaches 100,000 is 0.99 or more.

In the above-described samples 1 to 9, the thickness d of the stabilization layer was within the range of 10 to 40 µm, and the arithmetic average roughness Ra of the outer surface of the stabilization layer 6 was within the range of 0.1 to 2.0. However, if the ratio Ra/d is in the range of 0.005 to 0.03, the same effect may be obtained even if the thickness d of the stabilization layer and the arithmetic average roughness Ra of the outer surface of the stabilization layer 6 are changed.

REFERENCE SIGNS LIST

1: Substrate
1a: First main surface of substrate
1b: Second main surface of substrate
2: Intermediate layer
2a: Main surface of intermediate layer
3: Oxide superconducting layer
3a: Main surface of oxide superconducting layer
4: Protection layer
4a: Main surface of protection layer
5: Superconducting laminate
5a: First main surface of superconducting laminate
5b: Side surface of superconducting laminate
5c: Second main surface of superconducting laminate
6: Stabilization layer
6a: First main surface of the stabilization layer
6b: Side surface of the stabilization layer
6c: Second main surface of the stabilization layer
6d: Corner portion of the stabilization layer
10: Oxide superconducting wire
11: Resin tape
12: Insulating layer
100: Superconducting coil
101: Coil body

What is claimed is:

1. A superconducting coil configured by winding an oxide superconducting wire, the oxide superconducting wire comprising:
a superconducting laminate comprising a substrate and an oxide superconducting layer; and
a stabilization layer made of copper plating formed around the superconducting laminate, wherein:
a thickness d of the stabilization layer is within a range of 10 to 40 µm;
a ratio Ra/d of the thickness d of the stabilization layer and an arithmetic mean roughness Ra of an outer surface of the stabilization layer is in the range of 0.005 to 0.03;
an intermediate layer is arranged between the substrate and the oxide superconducting layer; and
when a tensile test of pulling the oxide superconducting wire in a longitudinal direction within a stress range of 180 to 600 MPa in liquid nitrogen is performed, a ratio (Ic/Ic0) of a critical current (Ic) when a repeated pulling number reaches 100,000 times and an initial critical current (Ic0) measured before the tensile test is 0.99 or more.

2. The superconducting coil according to claim 1, wherein the arithmetic mean roughness Ra of the outer surface is in the range of 0.1 to 1.0 µm.

3. The superconducting coil according to claim 1, wherein the thickness of the substrate is in the range of 50 to 75 µm.

4. The superconducting coil according to claim 1, wherein an insulating layer made of a resin tape is provided around the stabilization layer.

* * * * *